United States Patent
Yang et al.

(10) Patent No.: US 10,969,788 B2
(45) Date of Patent: Apr. 6, 2021

(54) ECU, AUTONOMOUS VEHICLE INCLUDING ECU, AND METHOD OF DETERMINING DRIVING LANE FOR THE SAME

(71) Applicants: Hyundai Motor Company, Seoul (KR); Kia Motors Corporation, Seoul (KR)

(72) Inventors: Seok Youl Yang, Incheon (KR); Tae Seok Lee, Seoul (KR); Seong Su Im, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 359 days.

(21) Appl. No.: 15/800,431

(22) Filed: Nov. 1, 2017

(65) Prior Publication Data

US 2018/0224857 A1 Aug. 9, 2018

(30) Foreign Application Priority Data

Feb. 8, 2017 (KR) .................. 10-2017-0017450

(51) Int. Cl.
*G05D 1/00* (2006.01)
*G05D 1/02* (2020.01)

(52) U.S. Cl.
CPC ......... *G05D 1/0212* (2013.01); *G05D 1/0246* (2013.01); *G05D 1/0257* (2013.01); *G05D 2201/0213* (2013.01)

(58) Field of Classification Search
None
See application file for complete search history.

(56) References Cited

U.S. PATENT DOCUMENTS

| 8,781,644 B2 | 7/2014 | Samukawa et al. |
| 8,825,260 B1 | 9/2014 | Silver et al. |
| 9,701,307 B1* | 7/2017 | Newman ............... B60W 10/20 |
| 10,324,189 B2* | 6/2019 | Luo ......................... G01S 17/87 |
| 2010/0033365 A1* | 2/2010 | Kishida .................. G01S 13/42 342/70 |
| 2011/0190972 A1* | 8/2011 | Timmons ............... G01C 21/34 701/31.4 |

(Continued)

FOREIGN PATENT DOCUMENTS

| JP | H07-146369 A | 6/1995 |
| JP | 2004-341941 A | 12/2004 |

(Continued)

*Primary Examiner* — Truc M Do
(74) *Attorney, Agent, or Firm* — Mintz Levin Cohn Ferris Glovsky and Popeo, P.C.; Peter F. Corless

(57) ABSTRACT

A method of determining a driving lane of an autonomous vehicle is provided. The method includes classifying, by an autonomous driving logic of an electronic control unit (ECU), at least one object sensed in front of the autonomous vehicle as a stationary object or a moving object. A clustering group is generated by clustering the stationary object and a boundary of an entire driving road is determined based on a position of a moving object approaching the subject vehicle among the moving objects and the clustering group. Additionally, the method includes comparing positions of a plurality of lanes based on lane widths of the lanes for travel of the subject vehicle with the boundary of the entire driving road and determining a driving lane of the subject vehicle.

17 Claims, 8 Drawing Sheets

(56) References Cited

U.S. PATENT DOCUMENTS

| | | | |
|---|---|---|---|
| 2012/0271483 A1* | 10/2012 | Samukawa | B60W 10/184 |
| | | | 701/1 |
| 2013/0147638 A1* | 6/2013 | Ricci | B60W 50/08 |
| | | | 340/905 |
| 2014/0136414 A1* | 5/2014 | Abhyanker | G06Q 50/28 |
| | | | 705/44 |
| 2015/0154871 A1* | 6/2015 | Rothoff | G05D 1/0088 |
| | | | 701/2 |
| 2015/0284001 A1* | 10/2015 | Watanabe | H04N 7/18 |
| | | | 701/36 |
| 2015/0334269 A1* | 11/2015 | Yokota | H04N 5/232 |
| | | | 382/103 |
| 2016/0121906 A1* | 5/2016 | Matsuno | B60K 28/10 |
| | | | 701/23 |
| 2017/0269602 A1* | 9/2017 | Nakamura | B60W 30/09 |

FOREIGN PATENT DOCUMENTS

| | | |
|---|---|---|
| JP | 2014-169996 A | 9/2014 |
| JP | 2015-001773 A | 1/2015 |
| JP | 2015-045622 A | 3/2015 |
| KR | 10-2015-0051697 | 5/2015 |
| KR | 10-2016-0040032 | 4/2016 |

\* cited by examiner

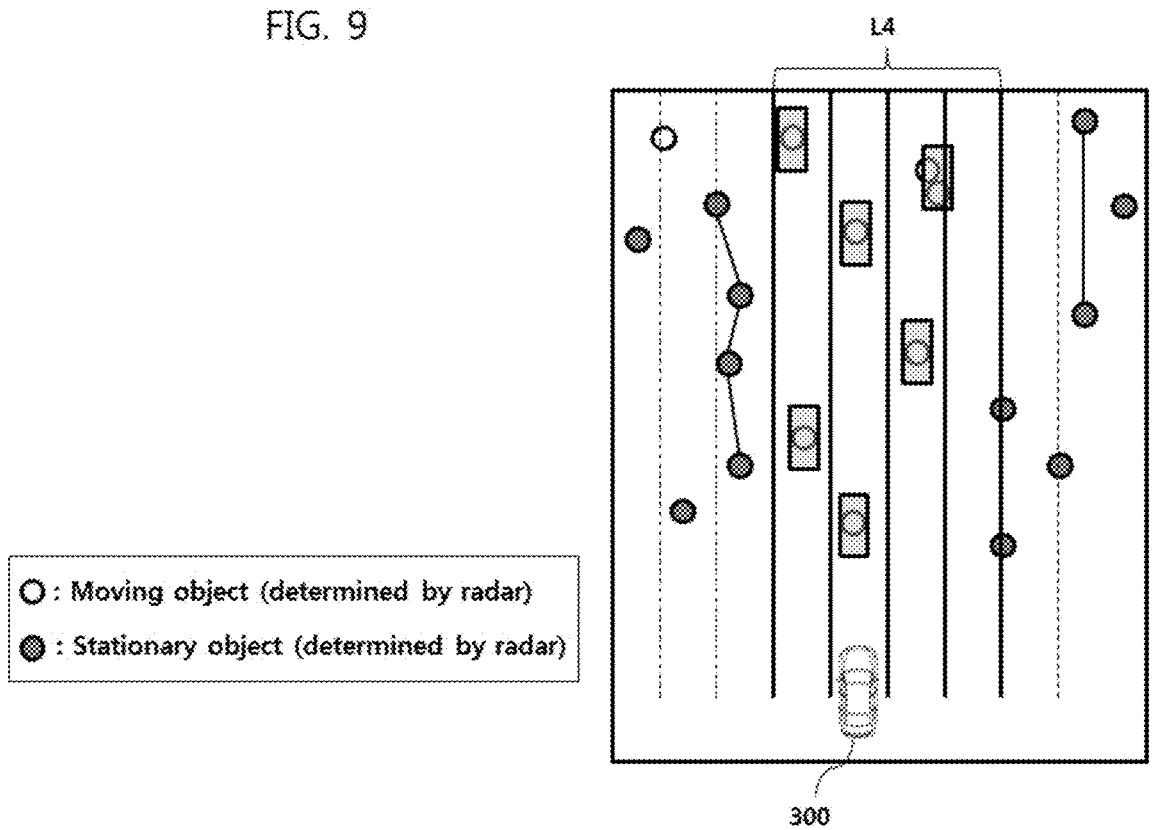

ECU, AUTONOMOUS VEHICLE INCLUDING ECU, AND METHOD OF DETERMINING DRIVING LANE FOR THE SAME

CROSS-REFERENCE TO RELATED APPLICATION(S)

This application claims the benefit of Korean Patent Application No. 10-2017-0017450, filed on Feb. 8, 2017, which is hereby incorporated by reference as if fully set forth herein.

BACKGROUND

Field of the Invention

The present invention relates to an electronic control unit (ECU), an autonomous vehicle including the ECU, and a method of determining a driving lane for the same, and more particularly, to an ECU capable of recognizing the position of a lane in which a vehicle is traveling, an autonomous vehicle including the ECU, and a method of determining a driving lane for the same.

Discussion of the Related Art

In recent years, there has been growing interest in autonomous navigation technology. Autonomous navigation technology refers to technology that enables a vehicle to be automatically driven without driver intervention. Additionally, the driving lanes of a road are recognized using images acquired using an imaging device during autonomous driving, and then whether the lane has been changed is determined based on the lane recognition.

However, since the lane recognized using the images is typically limited to the lane in which a subject vehicle is traveling, it is difficult to recognize lanes other than the lane in which the subject vehicle is traveling. Therefore, even when movement (e.g., relative position, relative speed, etc.) of a nearby vehicle is recognized using a distance measurement sensor such as radar or LiDAR mounted on the subject vehicle, it may be difficult to accurately use the information since the lanes in which the nearby vehicles are traveling cannot be determined.

SUMMARY

Accordingly, the present invention is directed to an ECU, an autonomous vehicle including the ECU, and a method of determining a driving lane for the same that substantially obviate one or more problems due to limitations and disadvantages of the related art. An object of the present invention is to provide an ECU capable of recognizing the location of a lane in which a subject vehicle travels during driving of an autonomous vehicle, an autonomous vehicle including the ECU, and a method of determining the driving lane for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of determining a driving lane of an autonomous vehicle may include an autonomous driving logic of an electronic control unit (ECU) configured to classify at least one object sensed in front of the autonomous vehicle as a stationary object or a moving object, generate a clustering group by clustering the stationary object, determine a boundary of an entire driving road based on a position of a moving object approaching the subject vehicle among the moving objects and the clustering group, and compare positions of a plurality of lanes based on widths of the lanes for travel of the subject vehicle with the boundary of the entire driving road and determine a driving lane of the subject vehicle.

In another aspect of the present invention, an electronic control unit (ECU) for an autonomous vehicle may include an entire driving road determination unit configured to classify at least one object sensed in front of the autonomous vehicle as a stationary object or a moving object, to generate a clustering group by clustering the stationary object, and to determine a boundary of an entire driving road based on a position of a moving object approaching the subject vehicle among the moving objects and the clustering group, and a subject vehicle driving lane determination unit configured to compare positions of a plurality of lanes based on widths of the lanes for travel of the subject vehicle with the boundary of the entire driving road and determine a driving lane of the subject vehicle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIGS. 3 to 9 illustrate the respective steps shown in FIG. 2 according to an exemplary embodiment of the present invention.

DETAILED DESCRIPTION

Figure 1:
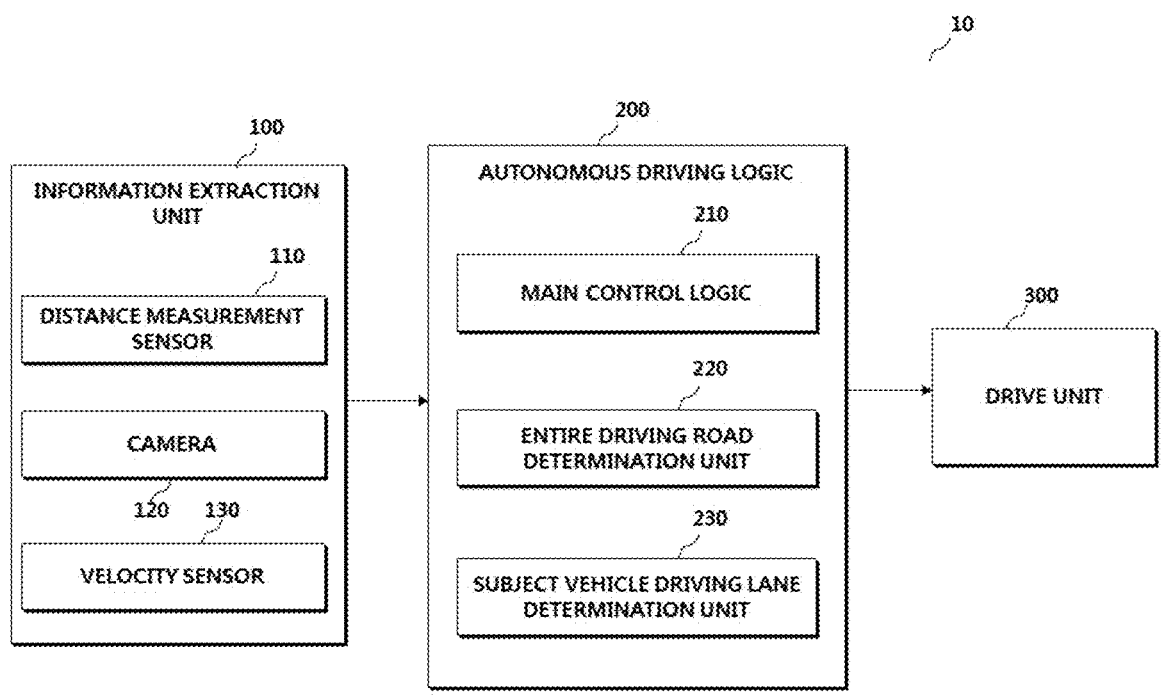
FIG. 1 is a block diagram schematically illustrating a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, the vehicle 10 is a vehicle to which autonomous navigation technology is applied. Autonomous navigation technology refers to technology that enables a vehicle to be automatically driven without driver intervention. Autonomous navigation technology aims to provide user convenience and safety through prevention of accidents.

The vehicle 10 may include an information extraction unit 100, an autonomous driving logic 200, and a drive unit 300. The information extraction unit 100 may be configured to collect information regarding the vicinity of the vehicle 10 (e.g., the surrounding environment) and may include a distance measurement sensor 110 configured to acquire distance information regarding an object located in the vicinity of the vehicle 10, an imaging device 120 (e.g., a camera, video camera, or the like) configured to acquire image information regarding the vicinity of the vehicle 10, and a velocity sensor 130 configured to sense a velocity at which the vehicle 10 is currently traveling. The autonomous driving logic 200 may be software, hardware, or a combination thereof to implement the function of autonomous driving. The autonomous driving logic 200 may be implemented as part of an electronic control unit (ECU) of the vehicle 10, but the present invention is not limited thereto.

The main control logic 210 may be responsible for overall control of the autonomous driving function. The main control logic 210 may generate a signal for operating the drive unit 300 based on the information provided by the entire driving road determination unit 220 or the subject vehicle driving lane determination unit 230. The entire driving road determination unit 220 may be configured to determine the entire driving road based on at least one of the distance information from the distance measurement sensor 110, the image from the camera 120, and the speed information of the vehicle 10. The entire driving road may refer to an entire road arranged in the same direction as the direction in which the vehicle 10 is traveling.

The subject vehicle driving lane determination unit 230 may be configured to determine the driving lane of the vehicle 10 and the driving lanes of nearby vehicles (e.g., neighboring or surrounding vehicles) from the information provided from the entire driving road determination unit 220, and provide the determination result based on a request from the main control logic 210. The operation of the entire driving road determination unit 220 and the subject vehicle driving lane determination unit 230 will be described in detail later with reference to FIGS. 2 to 9. Additionally, an overall controller having a processor and a memory may be configured to operate the entire driving road determination unit 220 and the subject vehicle driving lane determination unit 230.

The drive unit 300, configured to drive the vehicle 10 based on the control signal of the main control logic 220, may include elements for operating the vehicle such as a brake, an accelerator, a transmission, and a steering system. For example, when the control signal of the main control logic 220 is a signal instructing lane change to the left lane through acceleration, driving control, in which acceleration is applied by the accelerator of the drive unit 300 and torque is applied leftward by the steering system, may be executed by the drive unit 300.

Figure 2:
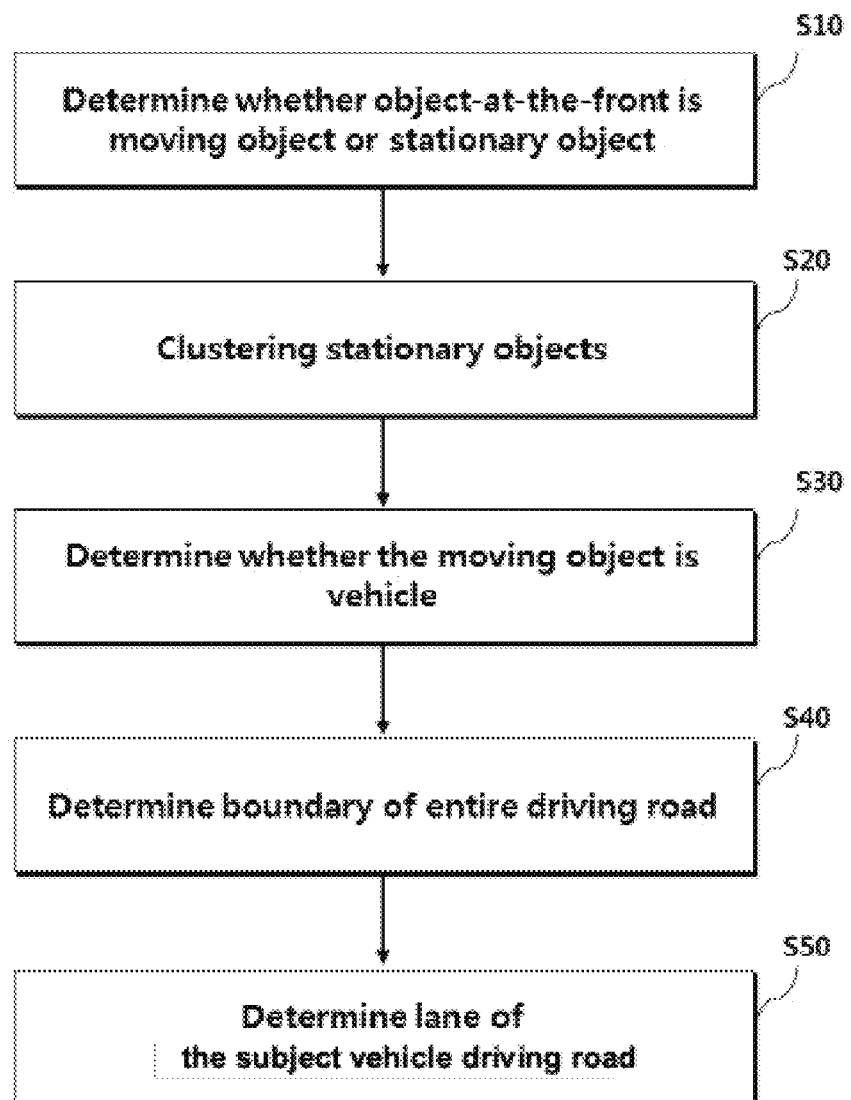
FIG. 2 is a flowchart illustrating an operation method of the autonomous driving logic shown in FIG. 1 according to an exemplary embodiment of the present invention.

FIG. 2 is a flowchart illustrating an operation method of the autonomous driving logic shown in FIG. 1. FIGS. 3 to 9 illustrate the respective steps shown in FIG. 2. Referring to FIGS. 2 to 9, the main control logic 220 may execute the driving road determination logic (the algorithm shown in FIG. 2) of the subject vehicle during travel of the subject vehicle 10 (In describing FIGS. 2 to 7, the vehicle 10 is referred to as a "subject vehicle").

First, the entire driving road determination unit 220 may be configured to receive distance information regarding at least one object positioned ahead (hereinafter, referred to as an "object-at-the-front") from the distance measurement sensor 110. The distance information regarding the object-at-the-front may include two-dimensional coordinates of the object-at-the-front with respect to the subject vehicle and the relative velocity of the object-at-the-front with respect to the subject vehicle. The relative velocity may be obtained by accumulating the two-dimensional coordinates of the object-at-the-front with respect to the subject vehicle.

The entire driving road determination unit 220 may be configured to calculate the absolute velocity of the object-at-the-front by performing a computational operation on the relative velocity of the object-at-the-front and the velocity of the subject vehicle from the velocity sensor 130. The entire driving road determination unit 220 may further be configured to compare the absolute value of the absolute velocity of the object-at-the-front with a threshold speed and determine whether the object-at-the-front is a moving object or a stationary object based on whether the absolute value of the absolute velocity of the object-at-the-front is greater than or equal to or is less than a threshold speed (S10). The threshold speed may be determined in consideration of a measurement error of the distance measurement sensor 110, and may be, for example, about 3 kph (kilometers per hour).

Figure 3:
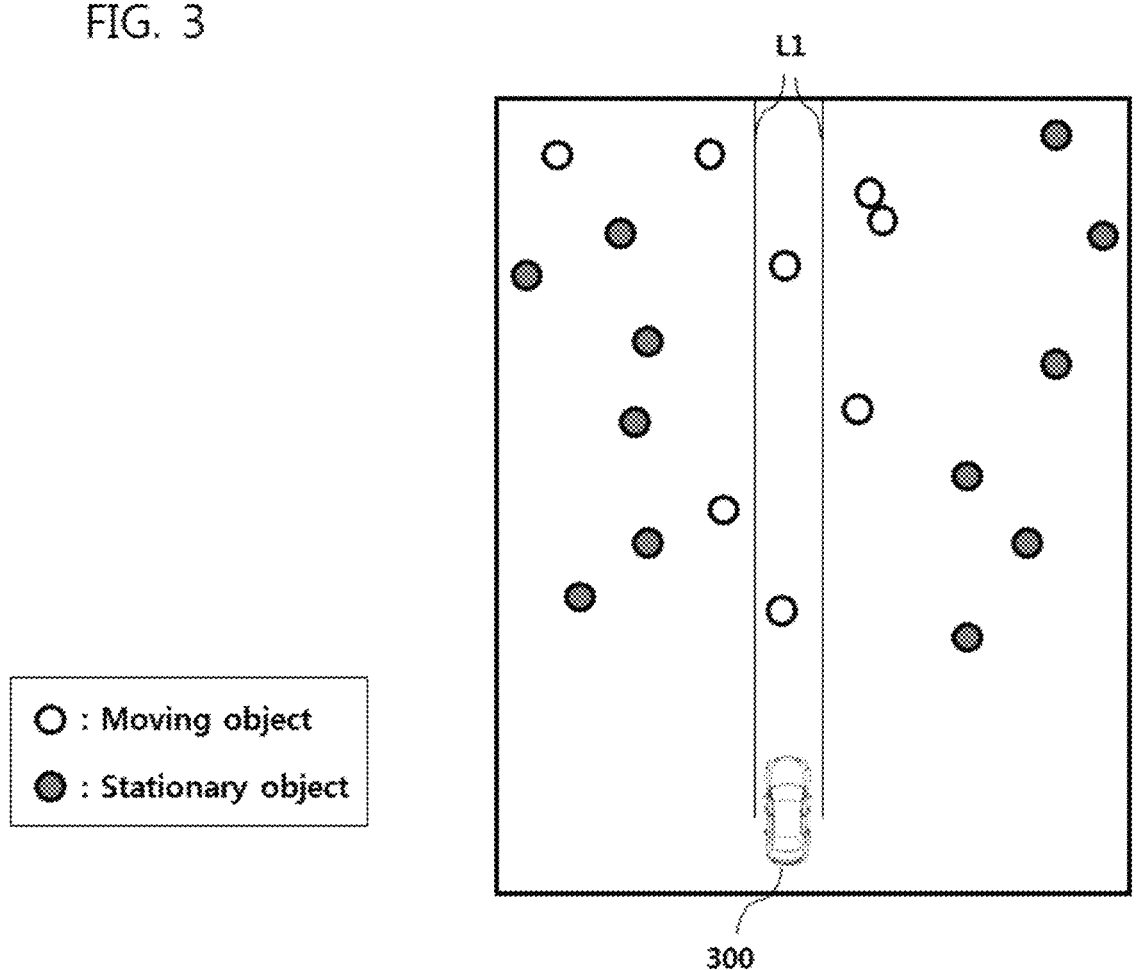

FIG. 3 shows the locations of the objects-at-the-front sensed in front of the subject vehicle 300. The entire driving road determination unit 220 may be configured to classify the objects-at-the-front into moving objects whose absolute velocities have absolute values greater than or equal to a threshold speed and stationary objects whose absolute velocities have absolute values less than the threshold speed, based on the absolute velocity of each object-at-the-front calculated from the relative velocity of each object-at-the-front and the velocity of the subject vehicle.

The entire driving road determination unit 220 may be configured to analyze the image from the camera 120, and determine the driving lane of the subject vehicle 300 with respect to the position of the subject vehicle 300 using at least one of the curvature of the lane in which the subject vehicle 300 is traveling, the slope in the travel direction with respect to the lane of the subject vehicle 300, and the distances from the subject vehicle 300 to the left and right lane lines (e.g., the boundary lines of the road lane).

The entire driving road determination unit 220 may be configured to calculate the curvature from the shape of the driving lane of the subject vehicle 300 recognized from the image of the camera 120 and calculate the slope in the travel direction of the subject vehicle 300 based on the curvature on the assumption that the image capture direction of the camera 120 is aligned with the travel direction of the subject vehicle 300. The entire driving road determination unit 220 may also be configured to calculate the distances from the subject vehicle 300 to the left and right lane lines based on the distances between the center of the image from the camera 120 and the left and right lane lines of the driving lane of the subject vehicle 300 recognized from the image from the camera 120, and may be configured to determine the width of the lane in which the subject vehicle 300 is travelling from the predetermined width of the subject vehicle 300 and the distances from the subject vehicle 300 to the left and right lane lines.

The entire driving road determination unit 220 may be configured to calculate two-dimensional coordinates of the driving lane L1 of the subject vehicle 300 with respect to the subject vehicle 300 and map the two-dimensional coordinates of the sensed moving object and the sensed stationary object to the two-dimensional coordinates of the driving lane L1 of the subject vehicle 300. Accordingly, the relationship between the coordinates of the distance information of the distance measurement sensor 110 and the coordinates of the image from the camera 120 may be stored in the autonomous driving logic 200, but the present invention is not limited thereto. While it is assumed in this specification that the driving lane L1 is straight as an example, the technical idea of the present invention may also be applied to where the driving lane L1 has a specific curvature.

Furthermore, the entire driving road determination unit 220 may be configured to cluster stationary objects having a particular relationship therebetween (S20). The particular relationship may be determined based on whether the angle formed between a straight line that connects adjacent stationary objects and the driving lane L1 is less than or equal to a threshold angle (e.g., about 15 degrees). When the driving lane has a specific curvature in contrast with the case of FIG. 4 where the driving lane L1 is straight, it may be determined whether the angle of the tangent line at the coordinates in the driving lane L1 corresponding to the ordinate (i.e., y coordinate) of the midpoint of the straight line that connects the adjacent stationary objects with respect the straight line that connects the adjacent stationary objects is less than or equal to a threshold angle.

Figure 4:
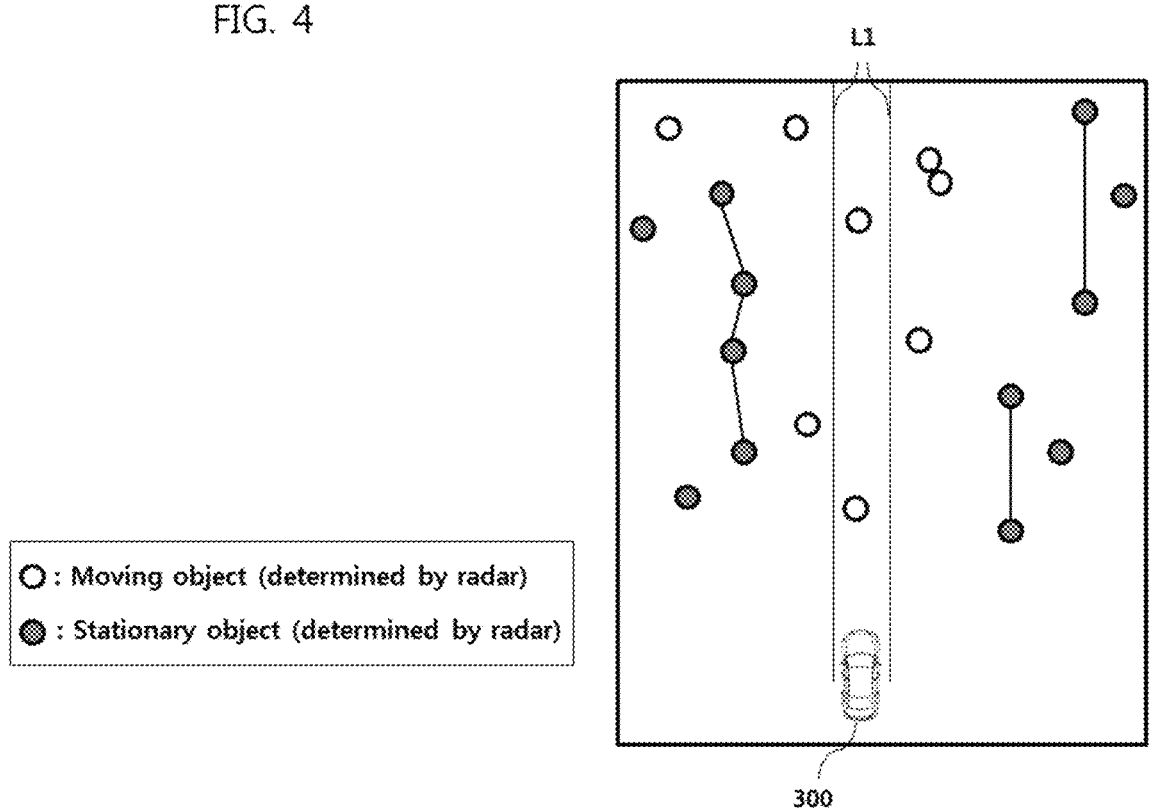

As shown in FIG. 4, the entire driving road determination unit 220 may be configured to determine whether the angle formed between the straight line that connects the adjacent stationary objects and the driving lane L1 is less than or equal to the threshold angle, and cluster the two adjacent stationary objects into a group when the angle is less than or equal to the threshold angle. Further, when a particular stationary object is bundled with one stationary object into one group and bundled with another stationary object into one group, the three stationary objects may be bundled into one group. FIG. 4 shows that four stationary objects that form one clustering group on the left side of the subject vehicle 300 based on the above principle.

Additionally, the entire driving road determination unit 220 may be configured to determine whether a moving object is a vehicle traveling in the same direction as the subject vehicle 300 based on the calculated absolute velocities of the objects-at-the-front. The absolute velocity of an object-at-the-front may have an ordinate velocity component (in the travel direction of the subject vehicle 300) and an abscissa velocity component (in the direction perpendicular to the travel direction of the subject vehicle 300).

The entire driving road determination unit 220 may also be configured to determine whether the ordinate velocity component of the absolute velocity of a moving object is within a predetermined velocity range and determine whether the object is a vehicle traveling in the same direction as the subject vehicle 300 based on the determination. For example, the predetermined velocity range may be from about 0 to 150 kph, and the entire driving road determination unit 220 may be configured to distinguish between a normal driving vehicle whose ordinate velocity component falls within the predetermined velocity range and a moving object whose ordinate velocity component is about −30 kph beyond the predetermined velocity range (e.g., a vehicle traveling in the opposite lane) or is about 250 kph (e.g., erroneous detection of a moving object).

According to an exemplary embodiment, the entire driving road determination unit 220 may further be configured to determine whether the amount of change in the ordinate velocity component of the absolute velocity of the moving object for a particular period (e.g., the measurement period of the distance measurement sensor 110) is within a certain range (between, for example, about −5 kph and +5 kph) to determine whether the object is a vehicle travelling in the same direction as the subject vehicle 300. When the amount of change of the ordinate component of the absolute velocity is excessive, the object is likely to be a moving object (e.g., erroneous detection or a flying object), not a vehicle.

According to an exemplary embodiment, the entire driving road determination unit 220 may further be configured to determine whether the amount of change in the abscissa velocity component of the absolute velocity of the moving object for a particular period (e.g., the measurement period of the distance measurement sensor 110) is within a certain range (between, for example, about −3 kph and +3 kph) to determine whether the object is a vehicle travelling in the same direction as the subject vehicle 300. When the amount of change in the abscissa component of the absolute velocity is excessive, the object is likely to be a moving object (e.g., erroneous detection or a flying object), not a vehicle.

Figure 5:
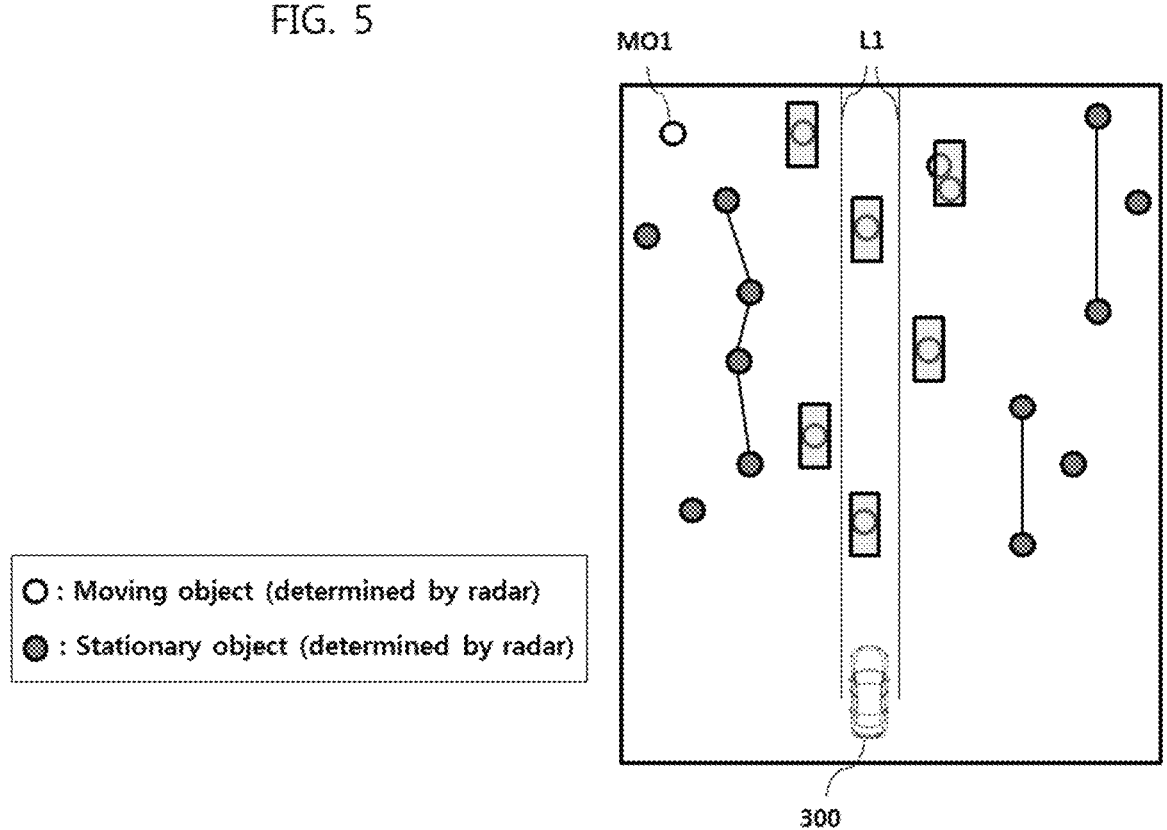

Moreover, as shown in FIG. 5, the entire driving road determination unit 220 may be configured to determine whether the moving objects are vehicles travelling in the same direction as the subject vehicle 300, based on the absolute velocities of the objects-at-the-front. When the moving objects are vehicles travelling in the same direction as the subject vehicle 300, the vehicles may be indicated by rectangles. Objects close to each other (e.g., within a particular distance to each other) such as those on the upper rightmost side of the figure may be determined as a single vehicle. When the ordinate velocity component of the absolute velocity of a first moving object MO1 is about −40 kph, the entire driving road determination unit 220 may be configured to determine that the first moving object MO1 is not a vehicle traveling in the same direction as the subject vehicle 300. The entire driving road determination unit 220 may then be configured to determine the boundaries of the entire driving road broadly based on first to fourth criteria (S40).

In particular, the first criterion is that an area between the innermost moving objects among the approaching moving object located on the left and right sides of the driving lane L1 shall be determined as a valid driving road. An object having a shorter lateral distance to the driving lane L1 may be defined as being positioned further inside. In addition, when there are approaching moving objects only on the left side of the driving lane L1 as shown in FIG. 5, the area of the inside (i.e., right side) of the moving objects may be determined as a valid driving road. For example, stationary objects belonging to a group on the left side of the subject vehicle 300 may be determined to be located on the inner side of the first moving object MO1. Additionally, when a moving object is an approaching object may be determined based on the ordinate velocity component of the absolute velocity of the moving object (or the velocity component that corresponds to the direction opposite to the travel direction of the vehicle).

The first criterion is intended to exclude an area outside the vehicle approaching the subject vehicle 300 (i.e., the vehicle traveling in the opposite direction) from the valid driving road since that area is likely to correspond to the road of the opposite lane. Performing determination only for the innermost approaching object is intended to determine the boundary of the valid driving road.

Figure 6:
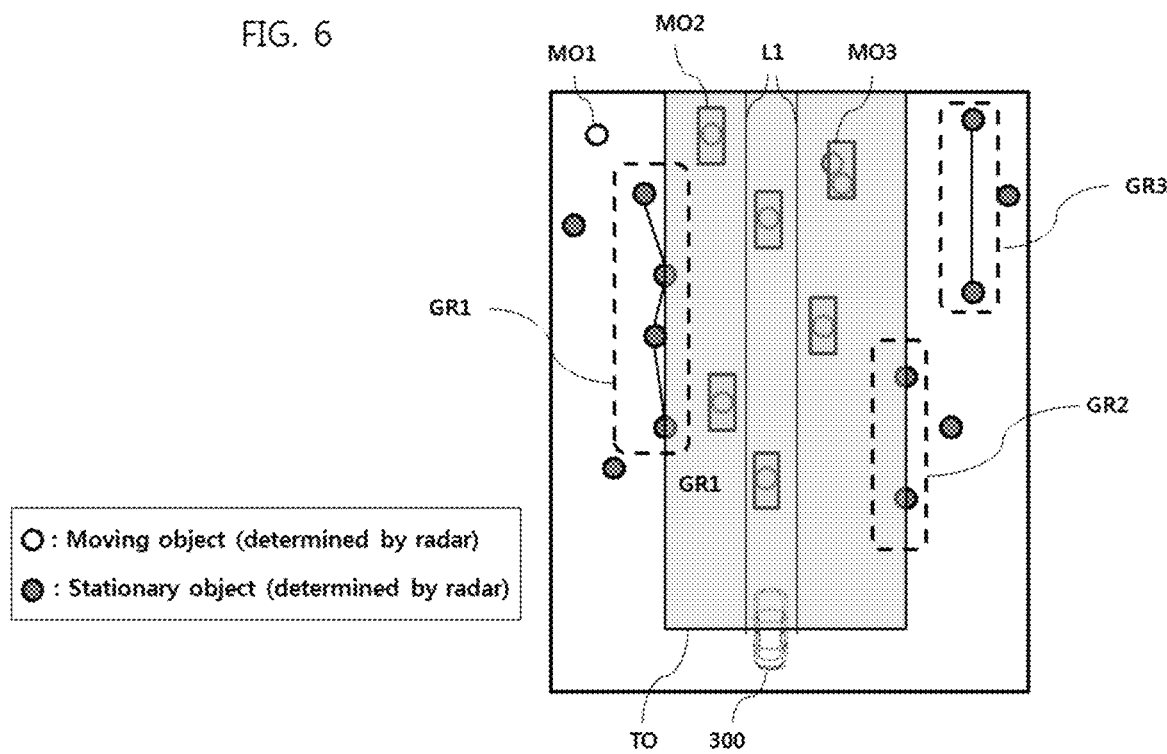

In FIG. 6, the right side of the first moving object MO1 may be determined as a valid driving road. The second criterion is that an area between the groups of stationary objects located closest to the left and right sides of the lane L1 in a group (clustering group) of clustered stationary objects shall be determined as a valid driving road. In FIG. 6, when there are the first group GR1 to the third group GR3 of clustered stationary objects, the first group GR1 is a group of stationary objects located closest to the left side of the subject vehicle 300, and the second group GR2 is a group of stationary objects located closest to the right side of the subject vehicle 300.

Therefore, the area between the first group GR1 and the second group GR2 may be determined as a valid driving road. When clustering groups exist only on the left or right side of the driving lane L1, the inner side (i.e., right or left side) of the clustering groups may be determined as a valid driving road. In particular, a stationary object located on the innermost side among the stationary objects included in the first group GR1 may be determined as a boundary of a valid driving road, and a stationary object located on the innermost side among the stationary objects included in the second group GR2 may be determined as a boundary of the valid driving road.

The third criterion is that an area between the vehicles located on the leftmost and rightmost sides of the driving lane L1 among the vehicles traveling in the same direction as the subject vehicle 300 shall be determined as a valid driving road. In FIG. 6, since the second moving object MO2 is the vehicle on the leftmost side of the subject vehicle 300 and the third moving object MO3 is the vehicle on the rightmost side of the subject vehicle 300, the area between the second moving object MO2 and the third moving object MO3 may be determined as a valid driving road.

The fourth criterion is that, when the area of a valid driving road is not specified by any of the first criterion to the third criterion, the area of the previous valid driving road specified before the current measurement period shall be determined as the area of the currently valid driving road. The entire driving road determination unit 220 may be configured to determine the area of a valid driving road based on at least one of the first to fourth criteria and determine the boundary TO of the entire driving road that corresponds to the valid driving roads.

The entire driving road determination unit 220 may further be configured to determine the boundary TO of the entire driving road, taking the first criterion as a criterion with the highest priority and assuming that the priority is lowered from the second criterion to the fourth criterion. In other words, even when an area is determined as a valid driving road by the second criterion, the area may not be determined as a valid driving road if it does not satisfy the first criterion. For example, even when there is a vehicle traveling in the same direction as the subject vehicle 300 on the right side of the second group GR2, the boundary TO of the entire driving road may be set based on a stationary object in the second group GR2, rather than a vehicle present on the right side of the second group GR2.

According to another exemplary embodiment, the entire driving road determination unit 220 may be configured to determine the boundary TO of the entire driving road based on the first criterion and the second criterion, which may be used to complement the boundary TO of the entire driving road determined based on the third and fourth criteria. The subject vehicle driving lane determination unit 230 may be configured to receive information including the boundary TO of the entire driving road from the entire driving road determination unit 220 and determine the driving lane of the subject vehicle 300 and the driving lanes of nearby vehicles (S50).

Figure 7:
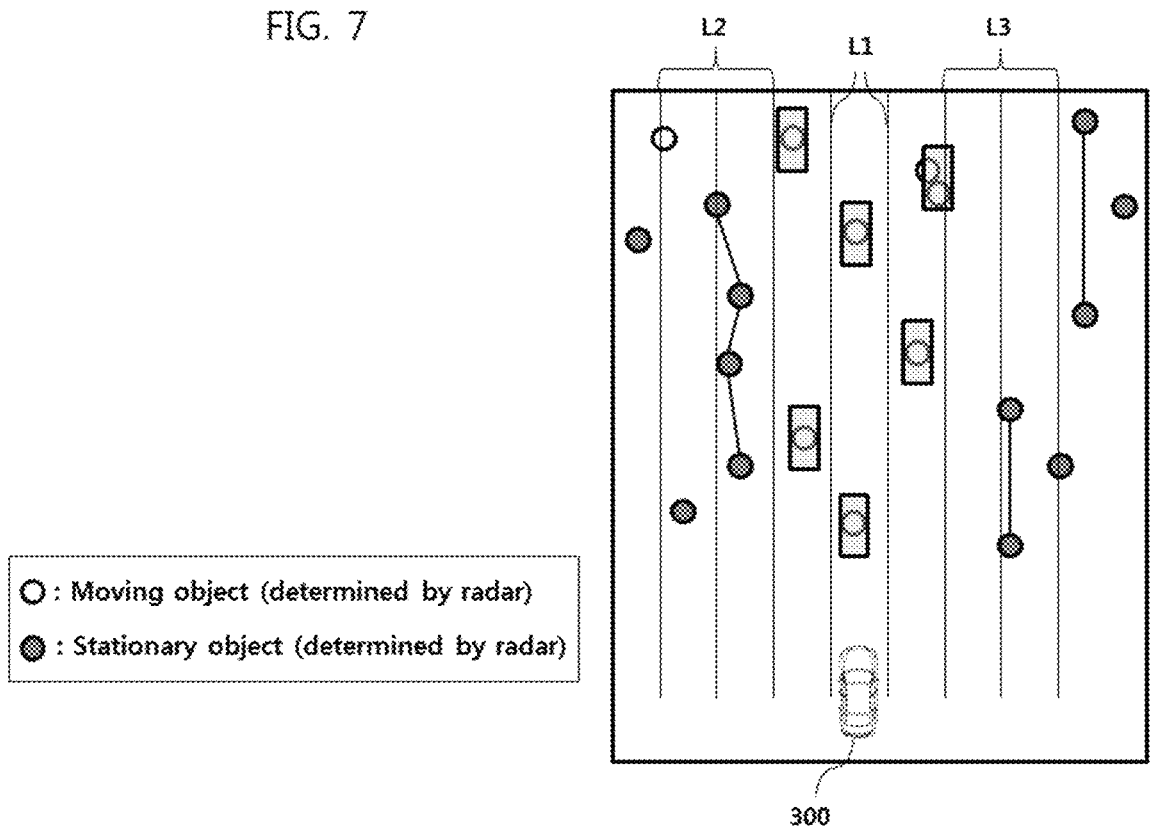

In FIG. 7, the subject vehicle driving lane determination unit 230 may be configured to set virtual lanes L2 and L3 having the same lane width on the left and right sides of the driving lane L1. Although FIG. 7 illustrates a case where the driving lane L1 is a straight line, when the driving lane L1 has a specific curvature, the virtual lanes may have the same curvature as the specific curvature.

Figure 8:
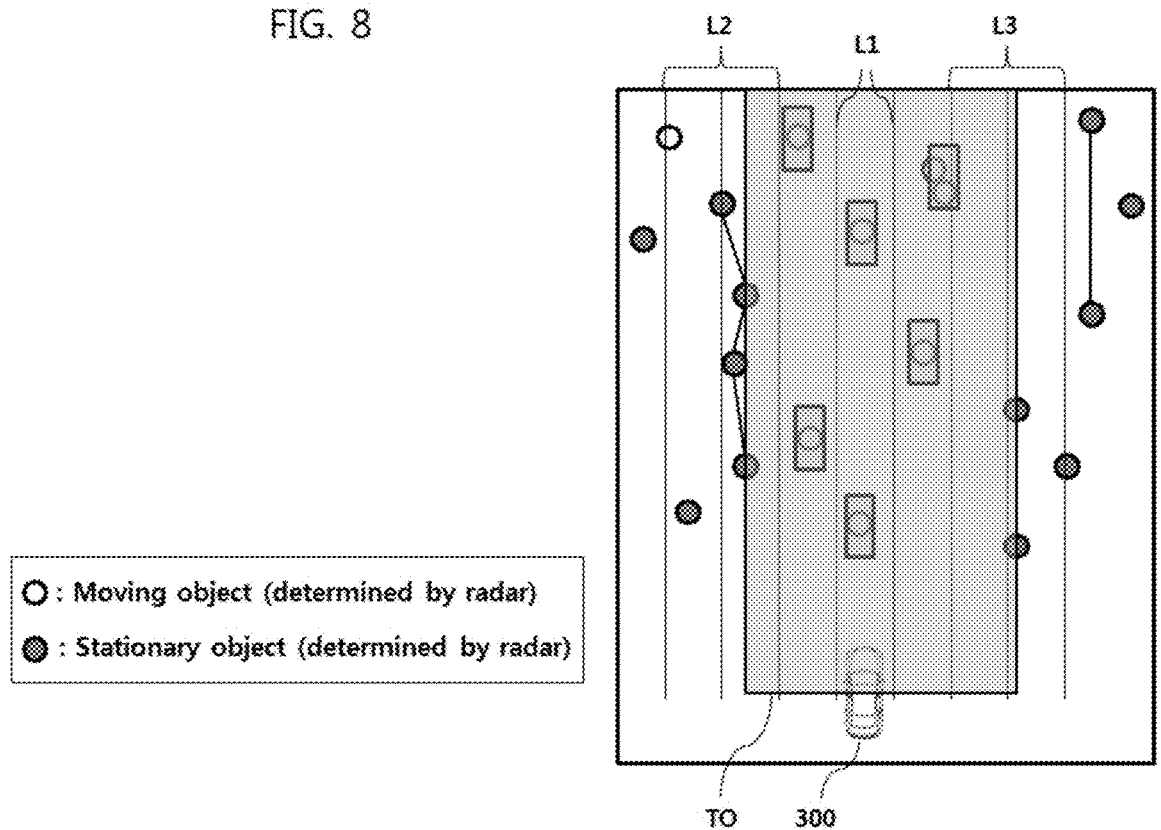

In FIG. 8, the subject vehicle driving lane determination unit 230 may be configured to map the boundary TO of the entire driving road to the virtual lanes L2 and L3 and determine lanes within the boundary TO of the entire driving road among the lanes L1 to L3. The subject vehicle driving lane determination unit 230 may be configured to determine a lane L4 located within the boundary TO of the entire driving road among the lanes L1 to L3 and determine the lane LA as the driving lane. Then, the subject vehicle driving lane determination unit 230 may be configured to determine the driving lane of the subject vehicle 300 (two lanes in FIG.

9) and the driving lanes of the nearby vehicles (e.g., the first lane, third lane, second lane, third lane, and first lane, second lane from the foremost vehicle) based on and the positional relationship between the driving lanes, the subject vehicle 300 and the nearby vehicle.

The subject vehicle driving lane determination unit 230 may then be configured to provide the driving lane of the subject vehicle 300 and the driving lanes of the nearby vehicles to the main control logic 210, and the main control logic 210 may be configured to execute drive control of the subject vehicle 300 such as lane change, overtaking, etc. based on the driving lane of the subject vehicle 300 and the driving lanes of the nearby vehicles by providing control signals to the overall controller programmed to execute the drive control.

Typically, according to the related art, the lane that may be detected more accurately by the camera 120 is only the driving lane of the subject vehicle 300, and it may be difficult to determine in which lane the subject vehicle 300 is located. Further, moving objects may be detected by the distance measurement sensor 110, but it may not be possible to determine in which lanes the moving objects are located. According to vehicles in an exemplary embodiment of the present invention, the lane in which the vehicle is traveling and the lanes in which the nearby vehicles travel may be recognized without a separate module for recognizing the driving lane of the subject vehicle. Further, by recognizing the lane in which the subject vehicle is traveling and the lanes in which the nearby vehicles travel, the lane change operation may be more safely implemented in a vehicle that provides the autonomous driving function.

The method described above may be implemented in a non-transitory computer-readable recording medium as code readable by a computer. The non-transitory computer-readable recording medium includes all types of recording media configured to store data readable by the computer system.

As apparent from the above description, the present invention has effects as follows. With an ECU, an autonomous vehicle including the ECU, and a method of determining a driving lane for the same according to an exemplary embodiment of the present invention, a driving lane in which the subject vehicle is traveling and driving lanes in which nearby vehicles are traveling may be recognized even without a separate module for recognizing the driving lane of the subject vehicle. Further, by recognizing the driving lane in which the subject vehicle is traveling and the driving lanes in which nearby vehicles are traveling, the lane change operation may be more safely implemented in a vehicle that provides an autonomous driving function.

The effects which can be obtained by the present invention are not limited to the above-mentioned effects, and other effects not mentioned herein can be clearly understood by those skilled in the art from the description above. It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A method of determining a driving lane of an autonomous vehicle, comprising:
classifying, by an autonomous driving logic of an electronic control unit (ECU), at least one object sensed in front of the autonomous vehicle as a stationary object or a moving object;
generating, by the ECU, a clustering group by clustering the stationary object;
determining, by the ECU, whether the moving object is a vehicle traveling in the same direction as a subject vehicle of the autonomous vehicle;
determining, by the ECU, a boundary of an entire driving road based on a position of a moving object approaching the subject vehicle among the moving objects and the clustering group; and
comparing, by the ECU, positions of a plurality of lanes based on lane widths for travel of the subject vehicle with the boundary of the entire driving road and determining a driving lane of the subject vehicle,
wherein the boundary of the entire driving road is determined based on at least one of first to fourth criteria having a priority,
wherein the first criterion determines a valid driving road based on an area between the moving object approaching the subject vehicle and the driving lane,
wherein the second criterion determines the valid driving road based on an area between the clustering group of stationary objects and the driving lane,
wherein the third criterion determines the valid driving road based on an area between the vehicles traveling in the same direction as the subject vehicle and the driving lane,
wherein the fourth criterion determines the valid driving road based on an area of a previous valid driving road specified before a current measurement period,
wherein the first criterion has a highest priority and the priority is lowered from the second criterion to the fourth criterion in order, and
wherein the determining of whether the moving object is the vehicle traveling in the same direction as the subject vehicle includes:
determining, by the ECU, whether an ordinate velocity component of an absolute velocity of the moving object is within a predetermined velocity range;
determining, by the ECU, whether an amount of change in the ordinate velocity component of the absolute velocity of the moving object for a predetermined period is within a first range; and
determining, by the ECU, whether an amount of change in an abscissa velocity component of the absolute velocity of the moving object for the predetermined period is within a second range.

2. The method according to claim 1, wherein the classifying includes:
performing, by the ECU, a computational operation on a velocity of the subject vehicle and a relative velocity of the at least one object and calculating an absolute velocity of the at least one object; and
comparing, by the ECU, an absolute value of the absolute velocity of the at least one object with a threshold speed and classifying the at least one object as the stationary object or the moving object.

3. The method according to claim 1, wherein the generating of the clustering group includes:
determining, by the ECU, whether adjacent stationary objects have a particular relation to each other,
wherein the particular relation is determined based on whether an angle between a straight line that connects the adjacent stationary objects and the driving lane of the subject vehicle is less than or equal to a threshold angle.

4. The method according to claim 1, wherein the determining of the boundary of the entire driving road includes:

determining, by the ECU, as a valid driving road, an area between moving objects located on innermost left and right sides with respect to the driving lane among the moving objects approaching the subject vehicle.

5. The method according to claim 4, wherein the determining of the boundary of the entire driving road further includes:
determining, by the ECU, as the valid driving road, an area between clustering groups located on innermost left and right sides with respect to the driving lane among the clustering groups.

6. The method according to claim 5, wherein the valid driving road determined based on the moving objects approaching the vehicle is prioritized over the valid driving road determined based on the clustering groups.

7. The method according to claim 5, wherein the determining of the boundary of the entire driving road further includes:
determining, by the ECU, as the valid driving road, an area between vehicles located on outermost left and right sides with respect to the driving lane among the vehicles traveling in the same direction as the subject vehicle.

8. The method according to claim 1, wherein the determining of the driving lane of the subject vehicle includes:
determining, by the ECU, a lane positioned within the boundary of the entire driving road as the driving lane among the plurality of lanes; and
determining, by the ECU, the driving lane of the subject vehicle based on the position of the subject vehicle in the lanes.

9. An electronic control unit (ECU) for an autonomous vehicle, the ECU comprising:
an entire driving road determination unit configured to classify at least one object sensed in front of the autonomous vehicle as a stationary object or a moving object, to generate a clustering group by clustering the stationary object, and to determine a boundary of an entire driving road based on a position of a moving object approaching a subject vehicle of the autonomous vehicle among the moving objects and the clustering group; and
a subject vehicle driving lane determination unit configured to compare positions of a plurality of lanes based on lane widths for travel of the subject vehicle with the boundary of the entire driving road and determine a driving lane of the subject vehicle,
wherein the boundary of the entire driving road is determined based on at least one of first to fourth criteria having a priority,
wherein the first criterion determines a valid driving road based on an area between the moving object approaching the subject vehicle and the driving lane,
wherein the second criterion determines the valid driving road based on an area between the clustering group of stationary objects and the driving lane,
wherein the third criterion determines the valid driving road based on an area between the vehicles traveling in the same direction as the subject vehicle and the driving lane,
wherein the fourth criterion determines the valid driving road based on an area of a previous valid driving road specified before a current measurement period,
wherein the first criterion has a highest priority and the priority is lowered from the second criterion to the fourth criterion in order, and
wherein the entire driving road determination unit is configured to determine whether the moving object is a vehicle traveling in the same direction as the subject vehicle by determining whether an ordinate velocity component of an absolute velocity of the moving object is within a predetermined velocity range, determining whether an amount of change in the ordinate velocity component of the absolute velocity of the moving object for a predetermined period is within a first range, and determining whether an amount of change in an abscissa velocity component of the absolute velocity of the moving object for the predetermined period is within a second range.

10. The ECU according to claim 9, wherein the entire driving road determination unit is configured to perform a computational operation on a velocity of the subject vehicle and a relative velocity of the at least one object to calculate an absolute velocity of the at least one object, and compare an absolute value of the absolute velocity of the at least one object with a threshold speed to classify the at least one object as the stationary object or the moving object.

11. The ECU according to claim 9, wherein the entire driving road determination unit is configured to determine whether adjacent stationary objects have a particular relation to each other, wherein the particular relation is determined based on whether an angle between a straight line that connects the adjacent stationary objects and the driving lane of the subject vehicle is less than or equal to a threshold angle.

12. The ECU according to claim 9, wherein the entire driving road determination unit is configured to determine, as a valid driving road, an area between moving objects located on innermost left and right sides with respect to the driving lane among the moving objects approaching the subject vehicle.

13. The ECU according to claim 12, wherein the entire driving road determination unit is configured to determine, as the valid driving road, an area between clustering groups located on innermost left and right sides with respect to the driving lane among the clustering groups.

14. The ECU according to claim 13, wherein the valid driving road determined based on the moving objects approaching the vehicle is prioritized over the valid driving road determined based on the clustering groups.

15. The ECU according to claim 13, wherein the entire driving road determination unit is configured to determine, as the valid driving road, an area between vehicles located on outermost left and right sides with respect to the driving lane among the vehicles traveling in the same direction as the subject vehicle.

16. The ECU according to claim 9, wherein the subject vehicle driving lane determination unit is configured to determine a lane positioned within the boundary of the entire driving road as the driving lane among the plurality of lanes, and determine the driving lane of the subject vehicle according to the position of the subject vehicle in the lanes.

17. An autonomous vehicle comprising:
an electronic control unit (ECU) comprising:
an entire driving road determination unit configured to classify at least one object sensed in front of the autonomous vehicle as a stationary object or a moving object, to generate a clustering group by clustering the stationary object, and to determine a boundary of an entire driving road based on a position of a moving object approaching a subject vehicle of the autonomous vehicle among the moving objects and the clustering group; and a subject vehicle driving lane determination unit configured to compare positions of a plurality of lanes based on lane widths for travel of the subject vehicle with the boundary of the entire driving road and determine a driving lane of the subject vehicle; and a drive unit configured to operate the vehicle based on a control signal generated by the ECU, wherein the boundary of the entire driving road is determined based on at least one of first to fourth criteria having a priority, wherein the first criterion determines a valid driving road based on an area between the moving object approaching the subject vehicle and the driving lane, wherein the second criterion determines the valid driving road based on an area between the clustering group of stationary objects and the driving lane, wherein the third criterion determines the valid driving road based on an area between the vehicles traveling in the same direction as the subject vehicle and the driving lane, wherein the fourth criterion determines the valid driving road based on an area of a previous valid driving road specified before a current measurement period, wherein the first criterion has a highest priority and the priority is lowered from the second criterion to the fourth criterion in order, wherein the entire driving road determination unit is configured to determine whether the moving object is a vehicle traveling in the same direction as the subject vehicle by determining whether an ordinate velocity component of an absolute velocity of the moving object is within a predetermined velocity range, determining whether an amount of change in the ordinate velocity component of the absolute velocity of the moving object for a predetermined period is within a first range, and determining whether an amount of change in an abscissa velocity component of the absolute velocity of the moving object for the predetermined period is within a second range.

* * * * *